United States Patent [19]

Wojcik et al.

[11] Patent Number: 4,689,823
[45] Date of Patent: Aug. 25, 1987

[54] DIGITAL IMAGE FRAME PROCESSOR

[75] Inventors: David R. Wojcik, Woburn; Thomas W. Studwell, South Hamilton, both of Mass.

[73] Assignee: Itek Corporation, Lexington, Mass.

[21] Appl. No.: 568,026

[22] Filed: Jan. 4, 1984

[51] Int. Cl.$^4$ .............................................. G06K 9/00
[52] U.S. Cl. ...................................... 382/41; 358/160; 382/49
[58] Field of Search ...................... 382/41, 49; 358/160

[56] References Cited

U.S. PATENT DOCUMENTS

4,484,346 11/1984 Sternberg et al. .................... 382/49
4,484,349 11/1984 McCubbrey .......................... 382/49

Primary Examiner—Leo H. Boudreau
Attorney, Agent, or Firm—Michael H. Wallach; Robert F. Rotella

[57] ABSTRACT

A frame processor for processing digitized image information includes a memory for storing a two-dimensional array of pixels, logic circuits for controlling the writing and reading of information into the memory, an arithmetic and logic unit having two inputs, one of which is coupled to the output of the memory, and a microprocessor for controlling operation of the arithmetic and logic unit and the logic circuits for controlling reading and writing.

13 Claims, 2 Drawing Figures

DIGITAL IMAGE FRAME PROCESSOR

BACKGROUND OF THE INVENTION

This invention relates to digital image processing in general, and more particularly, to an improved apparatus for processing frames of digitized information.

In operating on digitized image information, it is conventional to digitize frames of an image, e.g, a TV image into an array of pixels and store that array, the array, for example, being an array of 512×512 pixels. The digitized image may then be processed by combining the pixels in various mathematical or logic operations with other stored frames of information. Most prior art devices for doing this type of processing have done so at relatively low rates, off-line. However, there are applications, such as in medical diagnosis where on-line operation is extremely desirable. Furthermore, frame processors are called upon to do different functions. Information must be processed for interlacing and deinterlacing where conventional interlaced scan TV equipment is used. In other words, in processing, a deinterlaced frame is necessary. However, it may be received in an interlaced format and when again converted back to a video signal must be in an interlaced format for display on a conventional television screen. Frame processors must also do arithmetic and logic functions like addition and subtraction, in addition to being able to read any information into a frame processor memory. Futhermore there is a need for being able to carry out image intensity transformations in a frame processor. Although each of these functions could be separately built into different frame processors when needed system, there is a need for flexibility so that the frame processor can be used to do any of these functions, either under hardware or software control.

SUMMARY OF THE INVENTION

The present invention provides such frame processes. Basically, the frame processor includes a frame memory with the necessary address and read/write logic t information into and read information out of the processor. Each frame processor has associated therewith a system input bus, a system output bus two bidirectional buses. An input multiplexer selecting from the two bidirectional buses and the input bus signal is to be provided as the input to the memory. Similarly, multiplexers are provided on each output permitting any one of a number of outputs to be provided to that bus. These outputs include the memory output the output of an arithmetic-logic unit which follows memory or the output of an image intensity transformation means which follows the arithmetic logic unit.

Operation is controlled by an individual mircoprocessor within the device with additional control possible through connection to a direct memory access bus host computer.

DETAILED DESCRIPTION

Figure 1:
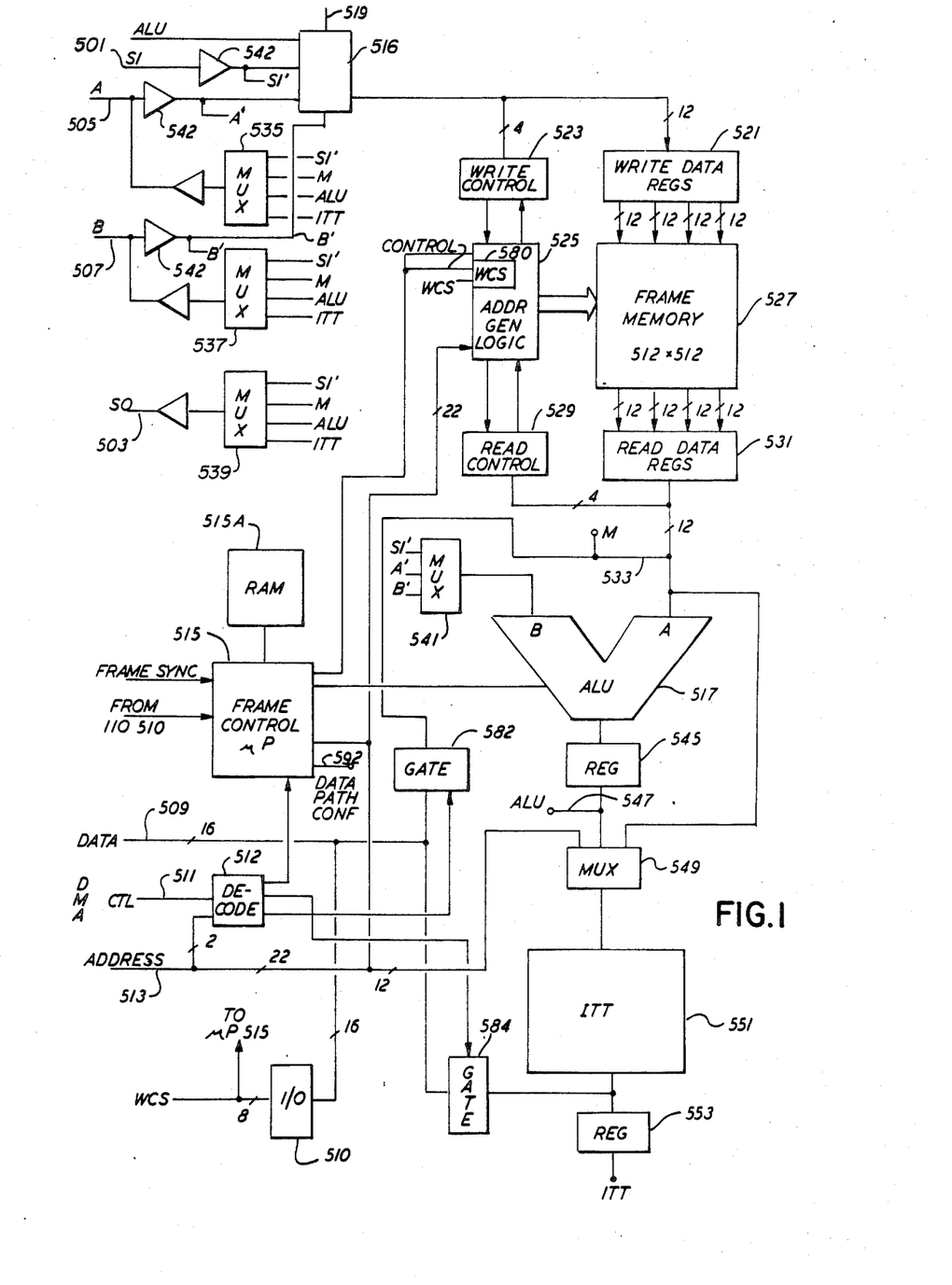
FIG. 1 is a block diagram of the frame processor according to the present invention.

The frame processor has associated with it four buses seen at the upper left of FIG. 1. There is a system input (SI) bus 501 and a system output (SO) bus 503, and bidirectional buses designated 505 and 507, known as the "A" and "B" busses. Each of the buses is a 16 bit bus with 12 bits for data and 4 bits for control (sync signals). The frame processors also have a direct memory access bus 504 with 16 bits of data, 8 bits of control on bus 511 and 24 bits of address on bus 513. Data bus 509 is coupled into a frame control microprocessor 515, through an I/10 module 510 described below, a separate processor being provided for each of the frame processors in the system. Control bus 511 is coupled through a decoder block 512 to processor 515. Outputs from decoder 512 labeled "ITT Access and RAM Access" are also provided. The outputs indicate where incoming data is directed.

The buses 501, 505 and 507 are coupled as inputs to a multiplexer 516 along with an input designated ALU which is the output of an arthmetic and logic unit 517 to be discussed in more detail below. One of these outputs is selected in accordance with a control signal, developed in processor 515, on line 519 into the multiplexer. (Each multiplexer in the frame processor has similar control lines. For most of the remaining multiplexers these are not shown for sake of simplicity.) The 12 data bits of the multiplexer are provided to write data registers 521 and the 4 control bits to write control logic 523. The write control logic cooperates with address generation logic 525 to control the operation of the write data registers. Information from the write data registers is transferred into a frame memory 527. The manner in which this data transfer is carried out is described in detail in U.S. application Ser. No. 568,025, entitled Digital Frame Processor Pipe Line circuit, filed on even date, herewith and assigned to the same assignee as the present invention.

Similarly, read control logic 529 operates to control the read data registers 531 in conjunction with address generate logic 525. The output from the frame memory data registers 531 is designated with the letter M on bus 533. This may be provided as a final output of the system on the A, B or SO bus through one of associated respective multiplexers 535, 537 or 539. However, it can also be provided as the A input to the ALU 517 in which an arithmetic or logic operation will be carried out on it. In particularly, it is possible for it to be involved in an operation with another piece of data provided to the B input. The B input is obtained from a multiplexer 541 having as inputs the buses SI', A' and B', these, respectively, corresponding to the SI bus, A bus and B bus after being coupled through a driver 542. The ALU 517 is controlled in its function over a line or bus 543 from the control processor 515. The output of the ALU is stored in a register 545 from which the signal designated ALU on line 547 may be taken off and provided as one of the outputs through one of the multiplexers 535, 537 and 539.

In addition, either the signal on line 533, ALU signal on line 547 or output from a multiplexer 541 can be selected by a multiplexer 549 and coupled through a image intensity transformation block 551, this comprising a memory in which the data coupled through the multiplexer 544 is used as address information to select a transformation function at the stored location. This output designated ITT data is then coupled into a register 553, the output of which is a further input to each of the multiplexers 535, 537 and 539.

The incoming data direct access bus data portion 509 is coupled through an I/0 module 510. Here, the 16 bits of data on the data bus are broken down into two 8 bit words. The output of the I/0 module 510 can be coupled to the microprocessor 515. Twelve lines of the data bus are also coupled through data drivers 582 and 584 respectively to the output on line 533 from the frame memory, and the data input/output of the image transformation memory 551.

The address bus associated with the direct access bus is coupled into the procesor 515, the address generate logic and also coupled to the multiplexer 549. The control bus 511 coupled through a decoder 512 selects, in conjunction with inputs from the address bus 513, the microprocessor, ITT access or frame memory access. With this arrangement, information on the direct memory access bus can be loaded into the frame control microprocessor. In addition, there is direct access to the frame memory and to the image transformation memory. This permits the host to look at the frame memory 527 and extract therefrom any pixel or group of pixels under its own address control. The corresponding output on line 533 is fed back over the data bus 509. In addition, the image transformation function stored in the image transformation memory can be adjusted from the host computer. In this case, the host computer addresses the particular memory location and then by means of the data bus loads into that location the desired transformation value. This permits using different transformation constants for different purposes and adjusting them as necessary.

Also microprocessor 515 is an output designated data path configure on line 592. This line, or particular parts of it are the inputs to the various multiplexers described previously and provide the control signals into those multiplexers to select the particular input or output desired.

Although the present system is adapted to operate on a 512 by 512 matrix, the system is adapted for expansion to higher resolution of a 1,000 or 2,000 lines.

Figure 2:
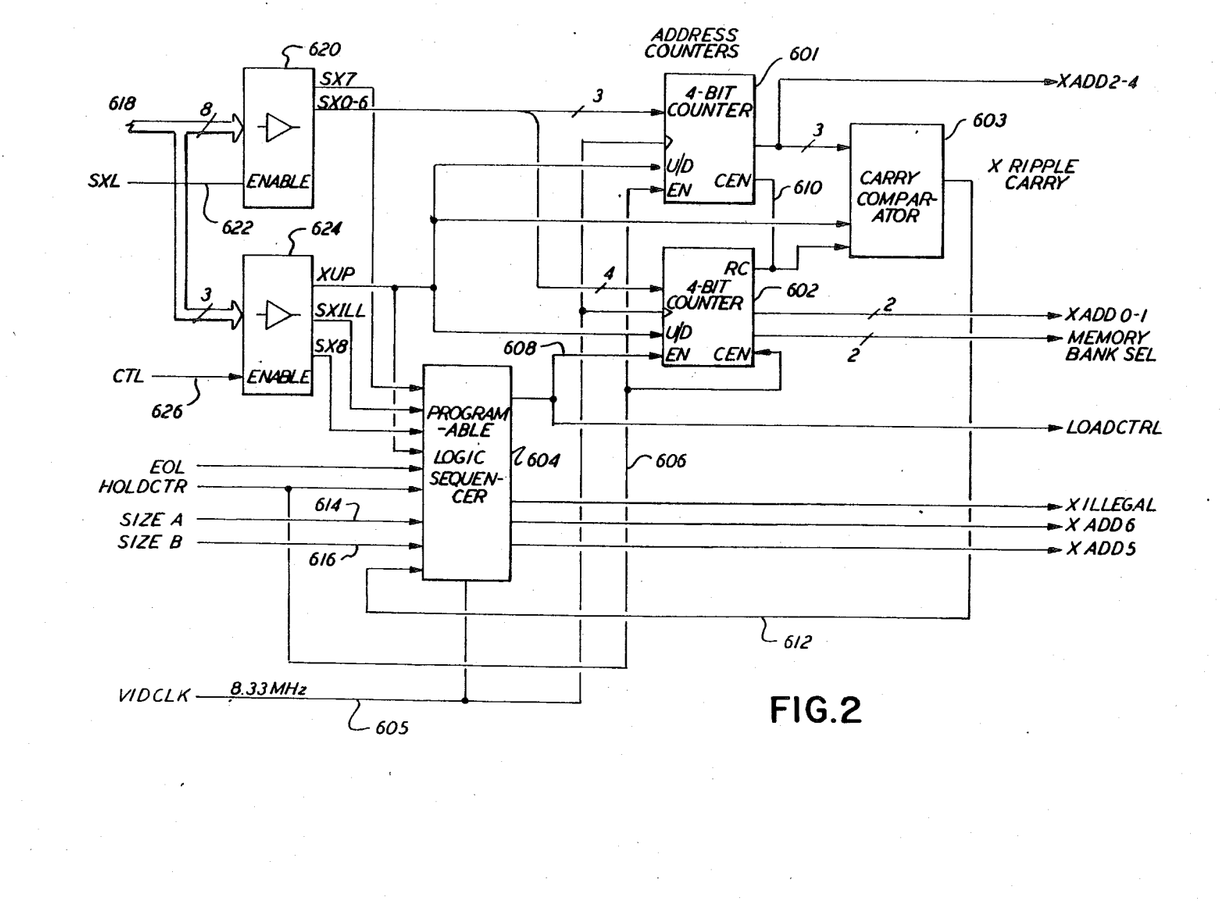
FIG. 2 is a more detailed block diagram of the X address generator hardware.

FIG. 2 is a block diagram of the X address generation hardware which permits this flexibility. This circuit utilizes two four bit counters 601 and 602 along with a carry comparator 603 and a programmable logic sequencer 604 to give the necessary flexibility. The clock signal on line 605 is provided as inputs to the count input of the two counters. The counters each have an input for presetting the counter and an up-down input along with chip enable and enable inputs. The use of these inputs will be explained below. The counter 602 provides four output lines. The first two of these output lines select a memory bank. The frame memory 527 of FIG. 1 is divided into four banks of memory. In order to operate at the necessary speed, as explained in co-pending application Ser. No. 10S-614 these memory banks are addressed in succession and thus the least significant 2 bits of the address select the memory bank. Counter 602 also provides the first 2 bits (0 and 1) of the X address in each individual memory bank. Counter 601 provides the X address bits 2, 3 and 4. The programmable logic sequencer 604 provides the X address bits 5 and 6 along with an indication of an illegal address bit. Bit 6 of the address bit is, in effect, the 9th bit and coresponds to a value of 256. Thus, when all of the bits through the 9th bit have a value of 1, the count is 511. Since the first pixel is at 0 this is the 512th pixel. Thus, the bits through the X address bit 6, are required to address 512 pixels. The X address bit, "XILLEGAL", is an extension bit to the normal memory address. The bit indicates the "PIXEL" being addressed does not actually exist and that a zero value should be returned by the memory. This permits virtual image fields to exist below the address boundary of zero and above the address boundary of 511.

In operation, the chip of counter 602 is enabled by a signal designated "HOLDCTR" and counting enabled by an output from the programmable logic sequencer 604 generated in response to the end of line signal "EOL". The counter 602, when enabled, begins counting clock pulses and generating, in succession, memory addresses with the first 2 bits selecting the memory bank and the third and fourth bits selecting locations wtihin each of the memory banks. When the counter generates a carry signal on line 610, this becomes a chip enable signal for counter 601 which also has its count enable input enabled by the signal on line 606. Thus, the counter 601 is now enabled to count and provide the next three bits of the address. The carry output of counter 602 and the three output lines of counter 601 are provided into a carry comparator 603 which contains logic to detect when a count of 128 is reached. At that point it generates a ripple carry on line 612 which is an input to the programmable logic sequencer 604. The programmable logic sequencer 604 has inputs on lines 614 and 616 designated "Size A" and "Size B". It is programmed so that, with a size A input in response to the ripple carry it will increment/decrement the X address bits 5 and 6 as well as the "XILLEGAL" address bit treating the X address as a ten bit value. The programmable logic sequencer will progressively increment/decrement these three bits until the EOL (End of Line) is generated. If size B is selected (indicating a 1024×1024 memory) then bit 6 becomes the lease significant bit of the Y address (giving 1024 legitimate addresses to Y and 256 legitimate addresses to X) and only bit 5 and XILLEGAL is changed with each ripple carry. In this manner 2048 addresses are provided for the Y address and only 128 are provided on the X address. Note that as the Digital Frame Processor is configured for larger memory sizes more units have to be connected in parallel to provide storage for the additional pixels. (Four units are needed for a 1024×1024 array, each unit providing 256 of the 1024 horizontal pixels.)

The illustrated logic also permits presetting the counter in a convenient manner to generate an X offset and allows counting up or down. Offset is important since it is used in matching images, i.e., a mask image and a medium image and the ability to do so quickly and efficiently is important if matching is to be attempted in real time. On a bus 618, data concerning the starting address is provided. Eight bits are provided into line drivers in block 620 enabled by an input on line 622. The first 7 bits, designated SXO-6, are provided as preset inputs to counters 602 and 601. The 8th bit is an input to the programmable logic sequencers 604. Three lines are provided as inputs to another line driver 624 enabled by a line 626. These are the signals "XUP" "SXILL" and "SX8" (the 9th bit). "SXILL" indicates that the starting address is in the "illegal" zone. The "XUP" signal controls whether counting is up or down and is provided as an input to the counter 601 and 602 into the carry comparator 603. With this arrangement, the counters and programmable logic sequencer can be preloaded for example with the address 511 and counting down to address 0 carried out to operate in reverse order. In terms of offset, an offset of anywhere from 1 to 511 bits can be provided. Through the use of the programmable logic sequencer 604, the number of hardware elements necessary to implement all these functions is considerably reduced.

SOFTWARE CONTROL OF THE FRAME PROCESSORS

Each frame processor has been assigned a mnemonic and serves a specific purpose as shown below:

"NI" (111)—Performs interlace to non-interlace conversion of camera data.

"ALU1"(113)—Performs ALU operations on frame data and is used for frame data transfers to and from LSI-11.

"ALU2" (117)—Performs ALU operations on frame data and is used for frame data transfers to and from LSI-11.

"DF" (122)—Performs ALU operations in degraded mode and is used for frame data transfers to and from LSI-11.

"I1" (123)—Performs interlace staging.

"I2" (125)—Performs non-interlace to interlace conversion of frame data.

Certain function code definitions for commands from the host apply for all frame processors and frame processor device addresses are outlines as follows:

| DRV11B Function Codes | Device Addresses |
|---|---|
| 0 — Write Data | NI — 7 |
| 1 — Read Data | ALU1 — 11 |
| 2 — Undefined | ALU1 — 13 |
| 3 — Write Address | DF — 17 |
| 4 — Send Control | I1 — 19 |
| 5 — Read Control | I1 — 21 |
| 6 — Undefined | Global — 63 |
| 7 — Board Select | |

Before any data is transferred to or from a frame processor, it must be selected via the board select function with the appropriate device address. The global device address can be used in conjunction with the board select function in which case subsequent data transfers will apply all frame processors.

Macros:

A frame processor macro is a collection of elements (described in detail below). Combined, these macro elements completely specify the configuration for a frame processor. A required configuration for a frame processor is accomplished by execution of a defined macro over a number of frames. A macro may execute finitely over from 1 to 255 frames or infinitely.

Macro Elements:

A macro element is a control word that is sent to a frame processor as part of a define-macro sequence. When received by a frame processor, a macro element is stored in the storage RAM 515A as part of the macro being defined. Macro elements do not directly affect the frame buffer configuration but, rather, are used by the micro-controller 515 to configure the frame processor when the macro is executed.

Macro-Set:

A macro-set is a collection of macros with corresponding frame counts. A frame processor contains exactly one macro-set which is stored in the storage RAM 515A. The macro-set is defined with "execute macro" commands and is executed with "go" command. Execution of a macro-set is the only way in which the microcontroller configures the frame buffer for real-time operation.

Macro Element Definitions:

Name: Bus Configuration (BC)
Control Word Format:

| "B Select" | Bits | | "B Enable" | Bit |
|---|---|---|---|---|
| B Bus Source | 1 | 0 | Output to Bus | 2 |
| SI Bus (501) | 0 | 0 | Disabled | 0 |
| Memory | 0 | 1 | Enabled | 1 |
| ALU | 1 | 0 | | |
| ITT | 1 | 1 | | |

| "A Select" | Bits | | "A Enable" | Bit |
|---|---|---|---|---|
| A Bus Source | 4 | 3 | Output to Bus | 5 |
| SI Bus | 0 | 0 | Disabled | 0 |
| Memory | 0 | 1 | Enabled | 1 |
| ALU | 1 | 0 | | |
| ITT | 1 | 1 | | |

| "SO Select | Bits | |
|---|---|---|
| SO Bus Source | 7 | 6 |
| SI Bus | 0 | 0 |
| Memory | 0 | 1 |
| ALU | 1 | 0 |
| ITT | 1 | 1 |

Name: ALU/ITT Control (AICTL)

-continued

| ITT Input | Bits | | ALU Function | Bits | | | |
|---|---|---|---|---|---|---|---|
| | 1 | 0 | | 7 | 6 | 5 | 4 |
| Memory | 0 | 0 | Clear (ALU=0) | X | 0 | 0 | 0 |
| ALU | 0 | 1 | B − MEM − 1 | 0 | 0 | 0 | 1 |
| ALU Input | 1 | 0 | MEM − B − 1 | 0 | 0 | 1 | 0 |
| Disable ITT | 1 | 1 | MEM + B | 0 | 0 | 1 | 1 |
| | | | MEM XOR B | X | 1 | 0 | 0 |
| | | | MEM OR B | X | 1 | 0 | 1 |
| ALU B/ITT | Bits | | MEM AND B | X | 1 | 1 | 0 |
| Input | 3 | 2 | Preset (ALU=1) | 0 | 1 | 1 | 1 |
| | | | B − MEM | 1 | 0 | 0 | 1 |
| SI Bus | 0 | 0 | MEM − B | 1 | 0 | 1 | 0 |
| A Bus | 0 | 1 | MEM + B + 1 | 1 | 0 | 1 | 1 |
| B Bus | 1 | 0 | Disable ALU | 1 | 1 | 1 | 1 |
| "Constant" | 1 | 1 | | | | | |

"X" denotes don't care.
ALU A-input is always memory. ALU B-input is selectable as SI bus, A bus, B, bus, or "constant." "Constant" is 4095 (FF HEX).

The frame processor ALU synchronizes its inputs. Since the A-input is always memory, it will normally "hold off" B-input until it has memory data. Depending on the memory read-write mode this could result in a lock-up of the frame processor. If the ALU function is "disabled" this problem is avoided.

The ALU operates on unsigned numbers. It saturates to all zeros on underflow and all ones on overflow.

Independent—There is no inter-dependence between memory reads and memory writes.

Read 1st, line—On a line-by-line basis, the write of a line is "held off" until that line has been read.

Write 1st, line—On a line-by-line basis, the read of a line is "held off" until that line has been written.

Read Disabled—Memory read is disabled.

Name: Frame Memory Control (FMC)
Control Word Format:

| Memory Input Source | Bits | | Memory Write Disable | Bits |
|---|---|---|---|---|
| | 1 | 0 | | 2 |
| SI Bus (501) | 0 | 0 | Write Enabled | 0 |
| A Bus (505) | 0 | 1 | Write Disabled | 1 |
| B Bus (507) | 1 | 0 | | |
| ALU (527) | 1 | 1 | | |

| Memory Read/Write Mode | Bits | | | Read/Write | Bit |
|---|---|---|---|---|---|
| | 5 | 4 | 3 | Offset | 6 |
| Independent | 0 | 0 | 0 | Read | 0 |
| Read 1st, line | 0 | 0 | 1 | Write | 1 |
| Write 1st, line | 0 | 1 | 0 | | |
| Unused | 0 | 1 | 1 | | |
| Read Disable | 1 | 0 | 0 | | |
| Read 1st, frame | 1 | 0 | 1 | | Bit |
| Write 1st, frame | 1 | 1 | 0 | Offset Enable | 7 |
| Read Synch. Indep. | 1 | 1 | 1 | | |
| | | | | No | 0 |
| | | | | Yes | 1 |

Read 1st, frame—On a frame-by-frame basis, the write of a frame is "held off" until that frame has been read.

Write 1st, frame—On a frame-by-frame basis, the read of a frame is "held off" until that frame has been written.

Read Synchronized—Memory read and memory write are based on independent asynchronous clocks. There is no interdependence between memory reads and memory writes.

The following is a breakdown of which read/write mode are used in various frame processors for specific operations and functionality.

| Read/Write Mode | Frame Processor | Cases |
|---|---|---|
| Independent | ALU1, ALU2, DF | ALU Accumulate Pass Through |
| Read 1st, line | ALU1, ALU2 | ALU Operations Except accumulate |
| Write 1st, line | None | None |
| Read Disable | ALU1, ALU1, DF | Default, Emergency, or degraded mode; when Bypassing A F. P. |
| Read 1st, frame | None | None |
| Write 1st, frame | I1 | Always except for when recording data on WBTR |
| Read Synchronized | NI | Always wnen recording data on WBTR |

Name: Coordinate Transformation Control (CTC)
Control Word Format:

```
15  14  13  12  11  10   9   8   7   6  5  4   3  2  1  0
--+---+---+---+---+---+---+---+---+---+--+--+------+------+-
 1   0   0   1   1   0   0   0
--+---+---+---+---+---+---+---+---+---+--+--+-+-----+------+-
                                          |  |  |  |  |  |
                                          |  |  |  |  |  X Read
                                          |  |  |  |  Y Read
                                          |  |  |  X Write
                                          |  |  Y Write
                                          |  Read Zoom Factor
                                          Write Mooz Factor
```

|  | Bit |  | Bit |
|---|---|---|---|
| X Read | 0 | Y Read | 1 |
| Increment | 0 | Increment | 0 |
| Decrement | 1 | Decrement | 1 |

|  | Bit |  | Bit |
|---|---|---|---|
| X Write | 2 | Y Write | 3 |
| Increment | 0 | Increment | 0 |
| Decrement | 1 | Decrement | 1 |

| Read | Bits | Write | Bits |
|---|---|---|---|
| Zoom Factor | 5  4 | Mooz Factor | 7  6 |
| No Zoom | 0  0 | No Mooz | 0  0 |
| TBD 1 | 0  1 | TBD 1 | 0  1 |
| TBD 2 | 1  0 | TBD 2 | 1  0 |
| TBD 3 | 1  1 | TBD 3 | 1  1 |

Note:
(1) X/Y read/write affects the orientation of a frame as it is read/written from/to a frame processor.
(2) Read Zoom factor causes individual pixels to be repeated in an NXN pattern as the frame is read out of a frame processor
(3) Write Mooz factor causes N:1 decimation to occur as a frame is written into a frame processor.

The following is a breakdown of which read/write mode are used in various frame processors for specific operations and functionality.

Name: Set X Offset (SXO)
Control Word Format:

```
15  14  13  12  11  10  9  8  7  6  5  4  3  2  1  0
--+---+---+---+---+---+---+---+---+--+----+-+-+-+--+
 1   0   1   0   0
--+---+---+---+---+---+---+---+---+--+----+-+-+-+--+
                                              |
                                              X Offset
```

| Two's Complement | Bits | | | | | | | | | | |
|---|---|---|---|---|---|---|---|---|---|---|---|
| Offset | | 10 | 9 | 8 | 7 | 6 | 5 | 4 | 3 | 2 | 1  0 |
| X Offset Of | 0 | 0 | 0 | 0 | 0 | 0 | 0 | 0 | 0 | 0 | 0  0 |
| X Offset Of | 1 | 0 | 0 | 0 | 0 | 0 | 0 | 0 | 0 | 0 | 0  1 |
| X Offset Of | 1023 | 0 | 1 | 1 | 1 | 1 | 1 | 1 | 1 | 1 | 1  1 |
| X Offset Of | −1024 | 1 | 0 | 0 | 0 | 0 | 0 | 0 | 0 | 0 | 0  0 |
| X Offset Of | −1023 | 1 | 0 | 0 | 0 | 0 | 0 | 0 | 0 | 0 | 0  1 |
| X Offset Of | −1 | 1 | 1 | 1 | 1 | 1 | 1 | 1 | 1 | 1 | 1  1 |

This funciton does not change frame memory contents but does affect how frame memory is read (i.e., next downstream FP will have the shifted frame in one frame time).

Name: Set Y Offset (SXO)
Control Word Format:

```
 15 14 13 12 11 10  9  8  7  6  5  4  3  2  1  0
--+---+---+---+---+---+-+-+-+-+-+-+-+-+-+-+-+-
  1    0    1    1    0
--+---+---+---+---+---+-+-+-+-+-+-+-+-+-+-+-+-
                                    └── Y Offset
```

| Two's Complement | Bits | | | | | | | | | | |
|---|---|---|---|---|---|---|---|---|---|---|---|
| Offset | 10 | 9 | 8 | 7 | 6 | 5 | 4 | 3 | 2 | 1 | 0 |
| Y Offset Of 0 | 0 | 0 | 0 | 0 | 0 | 0 | 0 | 0 | 0 | 0 | 0 |
| Y Offset Of 1 | 0 | 0 | 0 | 0 | 0 | 0 | 0 | 0 | 0 | 0 | 1 |
| Y Offset Of 1023 | 0 | 1 | 1 | 1 | 1 | 1 | 1 | 1 | 1 | 1 | 1 |
| Y Offset Of −1024 | 1 | 0 | 0 | 0 | 0 | 0 | 0 | 0 | 0 | 0 | 0 |
| Y Offset Of −1023 | 1 | 0 | 0 | 0 | 0 | 0 | 0 | 0 | 0 | 0 | 1 |
| Y Offset Of −1 | 1 | 1 | 1 | 1 | 1 | 1 | 1 | 1 | 1 | 1 | 1 |

This functions does not change frame memory contents but does affect how frame memory is read (i.e., next downstream FP will have the shifted frame in one frame time).

Frame Processor Command:

A Frame processor command is a control word that can be sent locally to a single frame processor globally to all frame processors. They differ from macro definition elements in that the must be sent directly to the frame processor(s) and may not be sent as a part of a macro definition. Frame processor commands and corresponding control word format are described individually below:

Command Name: Reset

Bus configuration is reset. Frame processor is removed from all buses. Frame memory read/write is disabled. Causes "macro set" pointer to be reset. Executes after next frame.

Control Word Format:

```
 15 14 13 12 11 10  9  8  7  6  5  4  3  2  1  0
--+---+---+---+---+---+-+-+-+-+-+-+-+-+-+-+-+-
  0   0   0   0   0   0  1  0  X  X  X  X  X  X  X  X
--+---+---+---+---+---+-+-+-+-+-+-+-+-+-+-+-+-
```

X - - Don't Care

Command Name: Stop

Frame memory is write disabled. Memory read and output bus configuration are not affected. Causes "macro set" pointer to be reset. Executes after next frame sync.

Control Word Format:

```
 15 14 13 12 11 10  9  8  7  6  5  4  3  2  1  0
--+---+---+---+---+---+-+-+-+-+-+-+-+-+-+-+-+-
  0   0   0   0   0   0  0  1  X  X  X  X  X  X  X  X
--+---+---+---+---+---+-+-+-+-+-+-+-+-+-+-+-+-
```

X - - Don't Care

Command Name: Freeze

Causes the input bus to be held off. Frame memory is write disabled. Memory read and output bus configuration are not affected. Cause "macro set" pointer to be reset. Executes after next frame sync.

Control Word Format:

```
 15 14 13 12 11 10  9  8  7  6  5  4  3  2  1  0
--+---+---+---+---+---+-+-+-+-+-+-+-+-+-+-+-+-
  0   0   0   0   0   0  1  0  X  X  X  X  X  X  X  X
--+---+---+---+---+---+-+-+-+-+-+-+-+-+-+-+-+-
```

X - - Don't Care

Command Name: Set Interlace Mode

Commands the frame processor to perform/not perform interlace conversion for input/output interlace data. This command should be sent to all frame processors as part of system initialization. This command is ignored if it is sent during the real-time frame buffer control (i.e., it is only implemented if the micro-controller is in "idle" mode).

Control Word Format:

```
 15 14 13 12 11 10  9  8  7  6  5  4  3  2  1  0
--+---+---+---+---+---+-+-+-+-+-+-+-+-+-+-+-+-
  0   0   0   0   0   1  0  0  X  X  X  X  X  X  X  X
--+---+---+---+---+---+-+-+-+-+-+-+-+-+-+-+-+-
                                          │  │
                                          │  └─ convert enable
                                          └──── in/out
```

X - - Don't Care

| Convert Enable | Bit 0 |
|---|---|
| Disable | 0 |
| Enable | 1 |

| In/Out | Bit 1 |
|---|---|
| Convert non-interlaced memory to interlaced output (Used with "read sync" mode) | 0 |
| Convert interlaced input to non-interlaced output (Used with "write 1st, frame" mode) | 1 |

Command Name: Select Memory

Selects frame/ITT memory for subsequent read/write data DMA transfers. Use this command to ensure that the data will be transferred from/to the intended source/destination. Executes immediately (no wait for frame sync).

Control Word Format:

```
 15 14 13 12 11 10  9  8  7  6  5  4  3  2  1  0
--+--+--+--+--+--+--+-+-+-+-+-+-+-+-+-+-
  0  0  0  0  0  1  0  1  X  X  X  X  X  X  X  X
--+--+--+--+--+--+--+-+-+-+-+-+-+-+-+-+-
                                          └─ ITT Select
```

X - - Don't Care

| ITT Select | Bit 0 |
|---|---|
| Frame Memory | 0 |
| ITT | 1 |

Command Name: Shift Image

Causes one pixel shift in the data stream as the frame is read in the +/−X/Y direction. Executes immediately (no wait for frame sync).

Control Word Format:

```
 15 14 13 12 11 10  9  8  7  6  5  4  3  2  1  0
--+--+--+--+--+--+--+-+-+-+-+-+-+-+-+-+-
  0  0  0  0  1  0  0  0  X  X  X  X  X  X
--+--+--+--+--+--+--+-+-+-+-+-+-+-+-+-+-
                                    └─ Shift Direction
```

X - - Don't Care

| Shift Direction | Bits 1 0 |
|---|---|
| X | 0 0 |
| -X | 0 1 |
| X | 0 0 |
| -X | 0 1 |
| Y | 1 0 |
| -Y | 1 1 |

Command Name: Home Image

Zeros out frame shift caused by "shift image" command in X and/or Y direction. Executes immediately (no wait for frame sync).

Control Word Format:

```
 15 14 13 12 11 10  9  8  7  6  5  4  3  2  1  0
--+--+--+--+--+--+--+-+-+-+-+-+-+-+-+-+-
  0  0  0  0  1  0  0  1  X  X  X  X  X  X
--+--+--+--+--+--+--+-+-+-+-+-+-+-+-+-+-
                                       │  └─ X Home
                                       └─ Y Home
```

X - - Don't Care

| X Home | Bit 0 | Y Home | Bit 0 |
|---|---|---|---|
| No | 0 | No | 0 |
| Yes | 1 | Yes | 1 |

Command Name: Go

Causes the "macro set" (see execute-macro command) for the addressed frame processor(s) to be executed a specified number of times. Execution begins after next frame sync. Once the execution begins, each macro in the "macro set" is executed for its respective number of frames.

Control Word Format:

-continued

```
15  14  13  12  11  10  9   8   7   6   5   4   3   2   1   0
--+---+---+---+---+---+---+-+-+-+-+-+-+-+-+-+-+-+-+-+-+-+-+-
 0   0   1   0   0   0   0   0
--+---+---+---+---+---+---+-+-+-+-+-+-+-+-+-+-+-+-+-+-+-+-+-
                                         └─── Repeat Count
```

| Repeat Count | Bits<br>7 6 5 4 3 2 1 0 |
|---|---|
| Repeat Infinitely | 0 0 0 0 0 0 0 0 |
| Repeat 1 Time | 0 0 0 0 0 0 0 1 |
| Repeat 255 Times | 1 1 1 1 1 1 1 1 |

Command Name: Define-Macro

Causes succeeding macro elements to be stored as macro #N. A macro can executed at any time once it is defined. This command would normally be followed by the 6 macro elements.

Control Word Format:

```
15  14  13  12  11  10  9   8   7   6   5   4   3   2   1   0
--+---+---+---+---+---+---+-+-+-+-+-+-+-+-+-+-+-+-+-+-+-+-+-
 0   1   0                       X   X   X   X   X   X   X   X
--+---+---+---+---+---+---+-+-+-+-+-+-+-+-+-+-+-+-+-+-+-+-+-
X — Don't Care              └──────── Macro #
```

| Macro Number | Bits<br>12 11 10 9 8 |
|---|---|
| Defined Macro #0 | 0 0 0 0 0 |
| Defined Macro #1 | 0 0 0 0 1 |
| Defined Macro #31 | 1 1 1 1 1 |

Command Name: Execute-Macro

Adds a macro with a frame count to a list in the addressed frame process(s). The list is referred to as a "macro set". This "macro set" is executed by the frame processor(s) when the next "go" command is received. A "macro set" can contain up to 16 macro/frame count pairs. A stop, reset, or freeze command resets the pointer into the "macro set" list.

Control Word Format:

```
15  14  13  12  11  10  9   8   7   6   5   4   3   2   1   0
--+---+---+---+---+---+---+-+-+-+-+-+-+-+-+-+-+-+-+-+-+-+-+-
 0   1   1
--+---+---+---+---+---+---+-+-+-+-+-+-+-+-+-+-+-+-+-+-+-+-+-
                    └──── Macro number         └─── Number of Frames
```

| Frame Execute Count | Bits<br>0 1 2 3 4 5 6 7 |
|---|---|
| Execute Infinitely | 0 0 0 0 0 0 0 0 |
| Execute for 1 frame | 1 0 0 0 0 0 0 0 |
| Execute for 255 frames | 1 1 1 1 1 1 1 1 |

| Macro Number | Bits<br>12 11 10 9 8 |
|---|---|
| Define Macro #0 | 0 0 0 0 0 |
| Define Macro #1 | 0 0 0 0 1 |
| Define Macro #31 | 1 1 1 1 1 |

What is claimed is:

1. A frame processor for processing digitized image information comprising:

a. a memory for storing a two-dimensional array of pixels;
b. means for controlling the writing and reading of information into said memory;
c. an arithmetic and logic unit (ALU) having two inputs, one of said inputs coupled to the output of said memory;
d. a microprocessor for controlling operation of said arithmetic and logic unit and said means for controlling reading and writing;
e. a first multiplexer having at least two input buses connected thereto for selecting which of said two input buses is coupled as an input to said memory;
f. a second multiplexer for selecting one of said two input buses as the second input to said arithmetic and logic unit; and g. a third multiplexer coupled to an output bus for selecting any one of a plurality of outputs from within said frame processor including the output of said memory, the output of said arithmetic and logic unit and one of said input buses as the output for said output bus.

2. Apparatus according to claim 1, and further incuding means for carrying out an image intensity transformation in said frame processor, said image information transformation output being provided as another selectable output to said third multiplexer.

3. Apparatus according to claim 2, and further including a fourth multiplexer between said ALU and said image intensity transformation means, permitting selection of one of the output of said ALU the first input to said ALU and the second input to said ALU as the input to said image intensity transformation means.

4. Apparatus according to claim 3 wherein at least one of said buses is a bidirectional input/output bus.

5. Apparatus according to claim 4, wherein each frame processor includes a system input bus, a bidirectional A bus, a bidirectional B bus, and a system output bus, said bidirectional buses and system output buses each having a multiplexer to select between the system input bus, the memory output, the ALU output and the image intensity transformation output.

6. Apparatus according to claim 5, and further including a direct memory access bus into said frame processor for providing address control and data signals.

7. Apparatus according to claim 6, wherein said image intensity transformation means comprises a random access memory, the inputs of which are coupled to the memory addresses, and the outputs of which are the data at those addresses, the memory programmed according to address value to provide an intensity transformation.

8. Apparatus according to claim 7, wherein said direct memory access includes an address bus adapted to be coupled through said fourth multiplexer as the address information to said image intensity transformation memory and said direct memory access data bus is coupled to the data lines of said memory whereby information can be remotely read into and out of said memory to change the intensity transformation function from a remote location.

9. Apparatus according to claim 8, wherein said direct memory access address bus is coupled to said means for controlling reading and writing to said frame memory whereby said frame memory can be remotely addressed and information read therefrom.

10. Apparatus according to claim 9, wherein said means for reading and writing comprise an X address generator and an Y address generator, said X address generator adapted to be preset to a desired starting address.

11. Apparatus according to claim 10, and further including means for the controlling the direction of incrementation of said X address.

12. Apparatus according to claim 10 wherein said X address generator includes inputs for selecting between lines of 512, 1024 and 2048 pixels.

13. Apparatus according to claim 12 wherein said X address generator comprises:
(a) a counter generating the first N bits of the address; and
(b) a programmable logic array generating the one, two or three most significant bits of the address.

* * * * *